March 28, 1944.   J. F. LUHRS   2,345,272
DENSITY MEASURING APPARATUS
Filed April 6, 1940   4 Sheets-Sheet 1

INVENTOR.
JOHN F. LUHRS
BY
ATTORNEY.

March 28, 1944.  J. F. LUHRS  2,345,272
DENSITY MEASURING APPARATUS
Filed April 6, 1940  4 Sheets-Sheet 2

INVENTOR
JOHN F. LUHRS
BY
Raymond W. Junkins
ATTORNEY

Patented Mar. 28, 1944

2,345,272

UNITED STATES PATENT OFFICE 2,345,272

DENSITY MEASURING APPARATUS

John F. Luhrs, Cleveland Heights, Ohio, assignor to Bailey Meter Company, a corporation of Delaware Application April 6, 1940, Serial No. 328,186

5 Claims. (Cl. 265—44)

This invention relates to the art of measuring and/or controlling the magnitude of a variable quantity, condition, relation, etc., and particularly such a variable condition as the density of a liquid-vapor mixture.

I have chosen to illustrate and describe as a preferred embodiment of my invention its adaptation to the measuring and controlling of the density and other characteristics of a flowing heated fluid stream, such as the flow of hydrocarbon oil through a cracking still.

While a partially satisfactory control of the cracking operation may be had from a knowledge of the temperature, pressure and rate of flow of the fluid stream being treated, yet a knowledge of the density of the flowing stream at different points in its path is of a considerably greater value to the operator, but was not available prior to the discovery of Robert L. Rude, as claimed in his Patent No. 2,217,634.

In the treatment of water below the critical pressure, as in a vapor generator, a knowledge of temperature, pressure and rate of flow may be sufficient for proper control, inasmuch as definite tables have been established for interrelation between temperature and pressure and from which tables the density of the liquid or vapor may be determined. However, there are no available tables for mixtures of liquid and vapor.

In the processing of a fluid, such as a petroleum hydrocarbon, a change in density of the fluid may occur through at least three causes.

1. The generation or formation of vapor of the liquid, whether or not separation from the liquid occurs.
2. Liberation of dissolved or entrained gases.
3. Molecular rearrangement as by cracking or polymerization.

The result is that no temperature-pressure-density tables may be established for any liquid, vapor, or liquid-vapor condition of such a fluid, and it is only through actual measurement of the density of a mixture of the liquid and vapor that the operator may have any reliable knowledge as to the physical condition of the fluid stream at various points in its treatment.

It will be readily apparent to those skilled in the art that the continuous determination of the density of such a flowing stream is of tremendous importance and value to an operator in controlling the heating, mean density, time of detention and/or treatment in a given portion of the circuit, etc. A continuous knowledge of the density of such a heated flowing stream is particularly advantageous where wide changes in density occur due to formation, generation, and/or liberation of gases, with a resulting formation of liquid-vapor mixtures, velocity changes, and varying time of detention in different portions of the fluid path. In fact, for a fixed or given volume of path, a determination of mean density in that portion provides the only possibility of accurately determining the time that the fluid in that portion of the path is subjected to heating or treatment. By my invention I provide the requisite system and apparatus wherein such information is made available continuously to an operator and furthermore comprises the guiding means for automatic control of the process or treatment.

While illustrating and describing my invention as preferably adapted to the cracking of petroleum hydrocarbon, it is to be understood that it may be equally adaptable to the vaporization or treatment of other liquids and in other processes.

Figure 1:
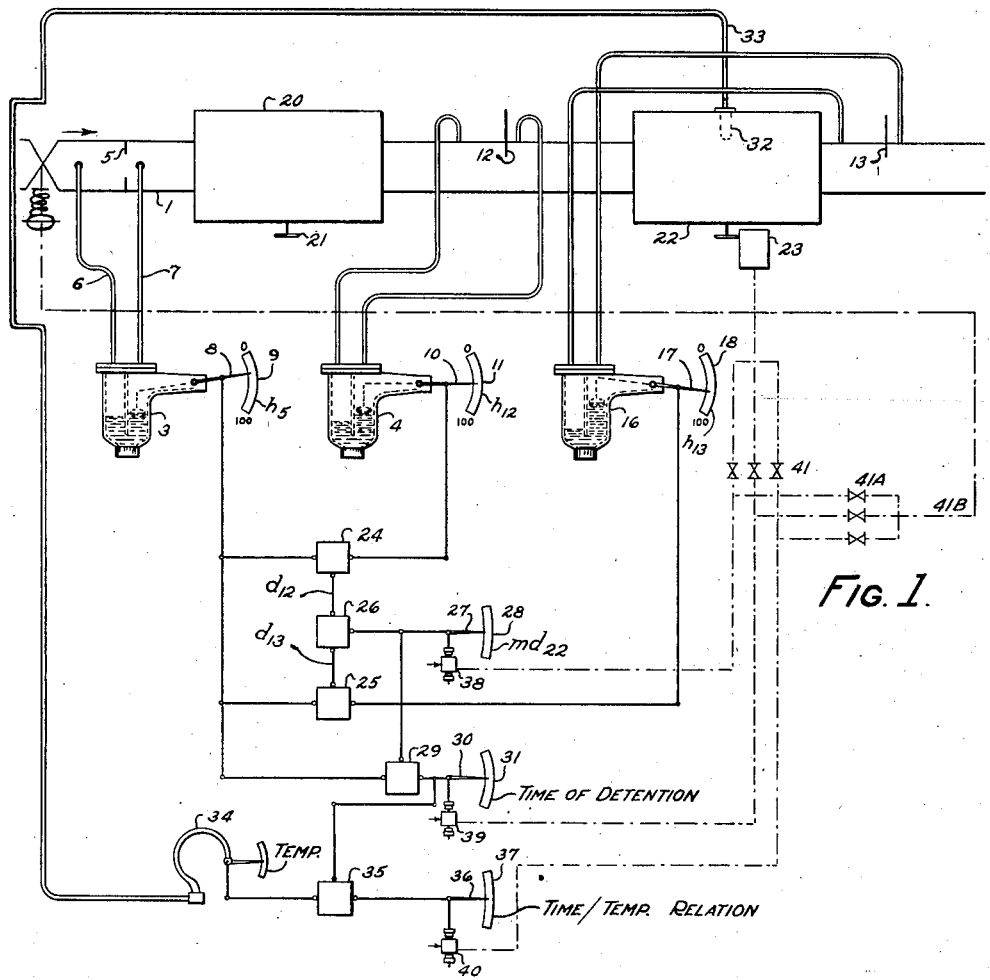
Fig. 1 is a diagrammatic arrangement of the invention in connection with a heated fluid stream.

Referring now in particular to Fig. 1, I indicate a conduit 1 which may be considered as comprising the once through fluid path of an oil still wherein a portion of the path is heated. The rate of flow of the charge or relatively untreated hydrocarbon is continuously measured by the rate of flow meter, or differential pressure responsive device 3, while a differential pressure responsive device 4 is located with reference to the conduit 1 beyond the heating means or after the flowing fluid has been subjected to heating or other processing.

The float actuated meter 3 is sensitive to the differential pressure across an obstruction, such as an orifice, flow nozzle, Venturi tube, or the like, positioned in the conduit for effecting a temporary increase in the velocity of the flowing fluid. Such an orifice may be inserted in the conduit between flanges as at 5. The meter 3 is connected by pipes 6, 7 to opposite sides of the orifice 5 and comprises a liquid sealed U-tube, in one leg of which is a float operatively connected to position an indicator 8 relative to an index 9. In similar manner the indicator 10 of the meter 4 is positioned relative to an index 11.

The relation between volume flow rate and differential pressure (head) is:

$$Q = CM\sqrt{2gh} \qquad (1)$$

where

Q = cu. ft. per sec.
C = coefficient of discharge
M = meter constant (depends on pipe diameter and diameter of orifice hole)
g = acceleration of gravity = 32.17 ft. per sec. per sec.
h = differential head in ft. of the flowing fluid.

The coefficient of discharge remains substantially constant for any one ratio of orifices diameter to pipe diameter, regardless of the density or specific volume of the fluid being measured. With C, M, and $\sqrt{2g}$ all remaining constant, then Q varies as $\sqrt{h}$. Thus it will be seen that the float rise of the meters 3, 4 is independent of variation in density or specific volume of the fluid at the two points of measurement and that the reading on the indexes 9, 11 of differential head is directly indicative of volume flow. If the conduit size and orifice hole size are the same at both meter locations, then the relation of meter readings is indicative of the relation of densities and specific volumes.

This may readily be seen, for if it were desired to measure the flowing fluid in units of weight, Equation 1 becomes:

$$W = CM\sqrt{2ghd} \qquad (2)$$

where

W = rate of flow in pounds per sec.
d = density in pounds per cu. ft. of flowing fluid.
h = differential head in inches of a standard liquid such as water.
M = meter constant now including a correction to bring h of Equation 1 into terms of h of Equation 2.

Assuming the same weight rate of flow passing successively through two similar spaced orifices 5, 12 and with a change in density as caused by the heating means 2, then the density at the second orifice 12 may be determined as follows:

$$W_{12} = W_5$$

$$\sqrt{2gh_{12}d_{12}} = \sqrt{2gh_5 d_5}$$

$$\sqrt{h_{12}d_{12}} = \sqrt{h_5 d_5}$$

$$d_{12} = d_5 \times \frac{h_5}{h_{12}} \qquad (3)$$

Thus it will be observed that, knowing the density of the fluid passing the orifice 5 I may readily determine the density of the fluid passing the orifice 12, from the relation of differential pressures indicated by the meters 3, 4.

After the fluid has passed through the orifice 12 it passes through a further heating section of the still, from which it passes through a third differential pressure producing orifice 13. In the preferred arrangement and operation of the still the section 22 is the conversion or cracking section, and the one in which it is primarily desirable to continuously determine the mean density of the fluid, as well as its time of detention or treatment in this section. For that reason I now desirably determine the mean density of the fluid in the section 22 and accomplish this through an interrelation of the differential pressures produced by the same weight flow passing successively through the orifices 5, 12, 13.

The same total weight of fluid must pass through the three orifices in succession so long as there is no addition to or diversion from the path intermediate the orifices. It is equally apparent that in the heating of a petroleum hydrocarbon, as by the section 20 between the orifices 5 and 12, there will be a change in density of the fluid between the two orifices, and furthermore that an additional heating of the fluid, as by the section 22, will further vary the density of the fluid as at the orifice 13 relative to the orifice 12.

Assume now that the conduit 1 is of a uniform size throughout and that the orifices 5, 12 and 13 are of uniform diameter and coefficient or characteristic. Through the agency of the meter 16 the differential pressure existing across the orifice 13 is continuously indicated upon an index 18 by indicator 17. The mean density of the conversion section 22 is then obtained by averaging the density of the fluid at the orifices 12, 13. As for example:

$$md_{15} = \frac{d_{12} + d_{13}}{2} \qquad (4)$$

The density of fluid at the orifice 13 may be obtained in the same manner, relative to the density of the fluid at the orifice 5, as was previously determined for the density of the fluid at the orifice 12. Simplifying this into a single operation, we have:

$$md_{15} = \frac{d_5 \times \frac{h_5}{h_{12}} + d_5 \times \frac{h_5}{h_{13}}}{2}$$

$$= d_5 \frac{\frac{h_5}{h_{12}} + \frac{h_5}{h_{13}}}{2} \qquad (5)$$

Thus the mean density of the fluid in the conversion section 22 (knowing the density or specific gravity of the fluid entering the system) may be directly computed from the readings of the indexes 9, 11, 18. This is of course on the basis that the orifices 5, 12, 13 are the same, and that the capacity of the float meters 3, 4, 16 is the same.

If the meter 3 is on a weight rate basis and indicates in terms of W = #/hr. then $$d_{13} = K\frac{W^2}{h_{13}}$$

where K = a constant, and $$md_{15} = \frac{K\frac{W^2}{h_{12}} + K\frac{W^2}{h_{13}}}{2}$$

In this event it is not necessary to determine the density or specific gravity of the fluid entering the system, as at the orifice 5, unless it departs from that to which the flow meter is calibrated, in which case the meter reading must necessarily be corrected to design condition.

Now as the specific volume increases progressively from locations 5 to 12 to 13 the differential pressure across these orifices increases in like manner, and in the operation of such a cracking still it may be that the differential pressure across an orifice 13 will be several times that across the orifice 5 if the orifice sizes are equal. I have, therefore, indicated that these orifices may be of an adjustable type whereby the ratio of orifice hole to pipe area may be readily varied externally of the conduit through suitable hand wheel or other means. The actual orifice design in terms of pounds per hour is:

$$W = 360 \; cfD^2 \sqrt{\frac{\max h}{sp.\; vol.}} \quad (6)$$

where $W = \#/hr.$
$D =$ diameter of equivalent circular orifice hole in inches
$c =$ coefficient of discharge
$f =$ factor of approach
sp. vol. $=$ cu. ft./lb.

Now considering that orifice 12 is so adjusted that its $cfD^2$ is different from that of orifice 5, we may then determine the density at 12A as follows:

$$d_{12} = CR^2$$

where $$C = d_5 \left(\frac{cfD_5^2}{cfD_{12}^2}\right)^2$$

$$R = \frac{\sqrt{h_5}}{\sqrt{h_{12}}}$$

$$d_{12} = d_5 \left(\frac{cfD_5^2}{cfD_{12}^2}\right)^2 \times \left(\frac{\sqrt{h_5}}{\sqrt{h_{12}}}\right)^2 \quad (7)$$

In similar manner I may determine the density at the orifice 13 regardless of the orifice area, so long as I take into account the $cfD^2$ of the orifice in the above manner. It will thus be seen that if the specific volume of the flowing fluid increases so rapidly that the differential heads at successive orifice locations (for the same design orifice) become many times the value of the differential head at the initial orifice, it would be impractical to attempt to indicate or record such differential heads relative to a single index or record chart without one or more of the indications or records going beyond the capacity of the index or chart. There are two ready means of overcoming this practical difficulty, the first being an adjustment of the successive orifices, such as 12, 13 to have new values of $cfD^2$ such that the indicator or recording pen will be kept on the chart; and the second through varying the basic capacity of the meter 4 or 16 relative to the meter 3. This latter method comprising so arranging the meter 4, for example, that it requires 50% greater differential pressure to move the related pointer over full index range than in the case of meter 3. This may readily be accomplished by properly proportioning the two legs of the mercury U-tube, on one of which the float is carried. Of course it will be necessary to take such change in capacity into account when utilizing the differential head readings in determining density or mean density.

For example, the reading of the pointer relative to the index should be on a percentage basis of whatever maximum head the meter is designed for. Then the total head corresponding to the indicator reading will be available or the proper correction may be applied. Assume that the meter U-tube 3 is so shaped that it requires 120" water differential applied thereto to move the indicator 8 from 0 to 100% travel over the index 9, and that for meters 4 and 16 it requires 250" water differential to cause the indicator 10 to move from 0 to 100% over the index 11, and 17 relative to 18. Then:

$F_3 = \%$ float travel of meter 3
$F_4 = \%$ float travel of meter 4

$$\frac{h_5}{h_{12}} = .48 \frac{F_3}{F_4}$$

substituting in (7)

$$d_{12} = d_5 \left(\frac{cfD_5^2}{cfD_{12}^2}\right)^2 .48 \frac{F_3}{F_4} \quad (8)$$

and $$md_{15} = \frac{.48 d_5}{2} \left[ \left(\frac{cfD_5^2}{cfD_{12}^2}\right)^2 \frac{F_3}{F_4} + \left(\frac{cfD_5^2}{cfD_{13}^2}\right)^2 \frac{F_3}{F_{16}} \right] \quad (9)$$

The fluid after passing the orifice 5 enters the heating section 20 having a hand actuated regulating means 21. The fluid then passes the orifice 12 and enters the heating section 22 wherein the heating is regulated by a control device 23. I have shown herein in diagrammatic fashion that the values $h_5$ and $h_{12}$ are applied to a mechanism 24, and the values $h_5$ and $h_{13}$ are applied to a mechanism 25. The resultant value of density of the fluid at the orifice 12 from the mechanism 24, and the resultant value of density of the fluid at the orifice 13 from the mechanism 25, are applied to a mechanism 26 which indicates by the pointer 27 upon the index 28 the value of mean density of the fluid passing through the heater 22. Mean density and $h_5$ are then applied to a mechanism 29 from which is indicated a resultant in terms of time by a pointer 30 upon an index 31.

In the operation of such a cracking still it is of considerable importance to determine the time-temperature relation of the conversion section, for example, the time that any particle remains in this section and the temperature to which it is subjected. To determine such temperature I indicate at 32 the bulb of a gas-filled thermometer system of which 33 indicates the connecting capillary and 34 a Bourdon tube whose free end is positioned responsive to the temperature at the bulb location.

The temperature sensitive means 34 and the time indicating means 30 then act through a mechanism 35 to move an indicator 36 relative to an index 37 to indicate directly the time-temperature relation of the fluid through the heating section 22.

I have indicated that the control mechanism 23 may be positioned in accordance with mean-density, time, or time-temperature relation. To accomplish this I provide air pilot valves 38, 39, 40 positioned respectively by the indicators 27, 30, 36 for controlling a pressure fluid and selectively made effective upon the control mechanism 23 by means of the valves 41.

The air loading pressure from the pilot valves 38, 39, 40 may be selectively made effective upon a fluid flow control valve in the conduit 1 through the agency of hand valves 41A and the pressure line 41B.

The air pilot valves 38, 39, 40 are of known type wherein axial movement of a pilot stem relative to fixed ports controls the pressure of a control fluid such as air at the outlet of the assembly. Such pilots are more fully described and claimed in the patent to Clarence Johnson, No. 2,054,464 granted September 15, 1936.

Figure 2:
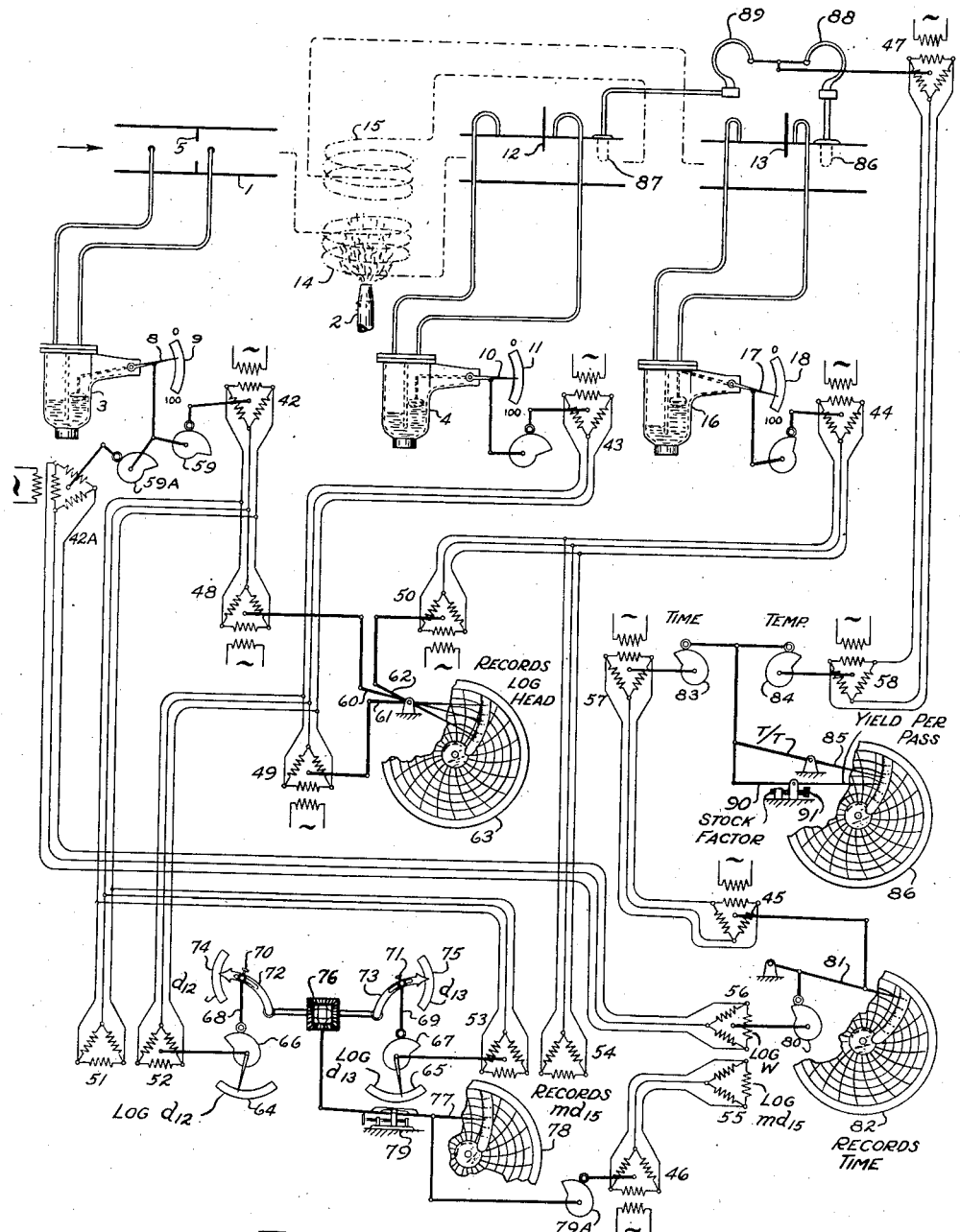
Fig. 2 is similar to Fig. 1 but, while diagrammatic, is in greater detail than Fig. 1.

In Fig. 2 I illustrate the actual mechanism which I preferably employ to accomplish the results which I have just described as diagrammatically illustrated in Fig. 1. For instance it will be observed that according to Equation 5 it is necessary in determining the mean density of the conversion section to obtain the ratio of the differential heads at orifices 5 and 12; then to obtain the ratio of the differential heads at orifices 5 and 13, to then average these ratios. My method is based on the use of logarithms, a process well known in mathematics, whereby it is possible to obtain a quotient by subtraction or a product by addition. In connection with logarithmically designed cams I employ self-synchronous motors which lend themselves readily to addition or subtraction through differential windings, as well as having the feature of ready grouping at remote locations.

I indicate such self-synchronous generators for transmission of position at 42, 42A, 43, 44, 45, 46 and 47, while the self-synchronous receiving motors are indicated at 48, 49, 50, 51—52, 53—54, 55—56, 57 and 58. The transmitting generator in each case is operated at a suitable angular rotation through the angular positioning of the rotor or single phase field winding. The stator or armature is in each case provided with a 3-phase winding. The field windings of each transmitting generator are energized from a suitable source of alternating current supply.

The operation of systems of this general character for the transmission of angular movement is well known in the art. Voltages are induced in the 3-phase stator windings of the transmitter or receiver by the single phase field winding on the associated rotor. When the rotor of one of the transmitters is moved from a predetermined position with respect to its stator, a change is effected in induced voltage in the armature winding and the rotor of the receiving motor assumes a position of equilibrium relative to the transmitting generator, wherein the induced voltages in the 3-phase windings are equal and opposite, and consequently no current is set up in the armature winding. If the rotor of one of the generators is turned and held in a new position the voltage is no longer counterbalanced, whereby equalizing currents are caused to flow in the armature windings which exert a torque on the rotor of the receiving motor, causing it to take up a position corresponding to the position of the transmitted generator.

The receiving motors 48, 49, 50 are individually positioned in synchronism with the transmitting generators 42, 43, 44. Between the indicator arm 8 and the transmitting generator 42 I interpose a cam 59 having a rise proportional to the logarithm of its angular motion to the end that the receiving motor 48 and the recording indicator 60 positioned thereby assume a position corresponding to log $h_5$. Similarly the indicator arm 61 is positioned by the receiving motor 49 in accordance with the value of log $h_{12}$, while the indicator 62 is positioned in accordance with the value of log $h_{13}$.

Actually the design is such that the transmitting generator 42 (positioned in accordance with log $F_3$) attains maximum desired rotation with from 10–100% full float travel. No motion of the generator 42 occurs when the float of the meter 3 moves over 0–10% of its travel range. This because it is impossible to have a logarithmic cam start at zero, as the number 0 has no logarithm. Also because the logarithmic characteristics are such that I would have as much cam rise for from 1% to 10% of float rise as for from 10% to 100%. Thus I may make the cam 59, and the similar cams of the meters 4 and 16, of practical size and proportion by sacrificing only the first 10% of the float travel of the meters and with the expectation that the operation will not normally be below 10% of full float travel.

In addition to indicating and recording in interrelation upon the record chart 63 the values of the log of the differential pressures at the three orifices, the positions of the transmitting generators 42, 43, 44 are utilized through the agency of differential self-synchronous devices to algebraically add the value of the log $h$ for the different orifices and thus accomplish the ratio operation. Angular movement imparted mechanically to the rotors of the transmitting generators 42, 43 will result in an angular positioning of the rotor of the receiving motor 51—52. Similar action occurs between the transmitting generators 42, 44 and the receiving motor 53—54; and between the transmitting generators 42A, 46 and the receiving motor 55—56.

The receiving motors 51—52, 53—54, and 55—56 have 3-phase rotor windings and 3-phase stator windings and are commonly known as differential self-synchronous motors, for in each case they are responsive to two of the transmitting generators and assume a rotor position corresponding in differential effect from the two related transmitters. For example, the receiving motor 51—52 has its rotor positioned responsive to a differential between the position of the rotor 42 and that of the rotor 43, or according to log $h_5$—log $h_{12}$, thus performing the mathematical operation:

$$\log \frac{h_5}{h_{12}} = \log h_5 - \log h_{12}$$

Correspondingly the receiving motor 53—54 has its rotor positioned responsive to a differential between the position of the rotor 42 and that of the rotor 44, thus performing the mathematical operation:

$$\log \frac{h_5}{h_{13}} = \log h_5 - \log h_{13}$$

From Equation 5 the mean density of the fluid in the conversion section is the density of the fluid at orifice 5 multiplied by the average of the ratio of heads for the different orifice locations 12A and 13A. In designing the apparatus I incorporate an average expected value of specific gravity or density of the fluid at the orifice 5 in the transmitted motion of the rotor of 51—52 and of the rotor of 53—54. Thus, if the expected density exists at the orifice 5, the indicator moved by the rotor of 51—52 will indicate relative to the index 64 the instantaneous value of log $d_{12}$ while on the index 65 may be read the instantaneous value of log $d_{13A}$.

The rotor of 51—52 angularly moves a cam 66 having a rise proportional to the antilog of its angular motion; likewise the rotor of 53—54 angularly moves an antilog cam 67. Thus the vertical movement of a roller at the lower end of a link 68, riding on the cam 66, is proportional to $d_{12}$ and that of 69 to $d_{13}$.

To obtain the mean density through the conversion section 15 it becomes necessary to solve Equation 4 and this I accomplish through a differential mechanism 76 adapted to position an indicator 77 relative to an index and recording chart 78 to continuously record thereon the value of $md_{15}$.

It is to be understood that if the basic capacity of meters 3, 4, 16 vary one from the other, then as previously brought out, this may be taken care of as in (8). The linkage through which the arm 10 positions 43 and the linkage through which the arm 17 positions 44, may incorporate the necessary correction values. Or it might be taken into account as at (9) at the outlet side of antilog cams 66, 67. Furthermore, I have illustrated and described the orifices 12 and 13 as being adjustable as to $cfD^2$ value and (9) such as may be taken into account at the same time.

Referring to Fig. 2, I have provided at 70—72 means for manually adjusting the effect of angular positioning of cam 66 upon one half of differential 76. Thus cam 66 which is angularly moved proportional to $$\log \frac{F_2}{F_4} \text{ or } \log \frac{h_5}{h_{12}}$$

will position the arm 72 relative to the index 74 according to $$d_5 \left(\frac{cfD_5^2}{cfD_{12}^2}\right)^2 \frac{h_5}{h_{12}}$$

or $d_{12}$. Likewise on 75 may be indicated $d_{13}$. The differential 76 then positions the arm 77 according to $$\frac{d_{12}+d_{13}}{2}$$

or $md_{15}$.

At 79 I indicate a manual adjustment of the motion of arm 77 to take into account deviations in value of $d_5$ of (9) from design conditions, as might be attributed to changes in specific gravity, temperature, etc.

The arm 77 is adapted to position a logarithmic cam 79A for moving a transmitter 46 proportional to log $md_{15}$. The meter 3 positions a cam 59A for moving a transmitter 42A proportional to log $\sqrt{h_5}$, which so long as $d_5$ remains constant equals log W where W is rate of flow in lbs. The differential motor 55—56 is then under the influence of the transmitters 42A, 46 representative of log W and log $md_{15}$ and the resulting angular motion of cam 80 is:

$$\log T = \log md_{15} - \log W$$

Cam 80 is of antilog design and the arm 81 is moved relative to record 82 to indicate the time of detention of any particle of fluid in the heating section 15, from:

$$T = \frac{V m d_{15}}{W}$$

where

T = Time any particle is in section 15.
V = Volume between 12A and 13A (cu. ft.)
$md_{15}$ = Mean density (lbs. per cu. ft.)
W = Rate of flow (lbs. per unit T)

The position of the arm 81 is used to angularly position a transmitter 45, in turn positioning a receiver 57 and cam 83. Closely related is a cam 84 positioned by a receiver 58 under the control of a transmitter 47 responsive to mean temperature of the fluid mixture. Temperature responsive bulb 86 is located in the fluid at the outlet of the heating section 15, while bulb 87 is located at the inlet to the section. The corresponding Bourdon tubes 88, 89 are arranged to position the transmitter 47 according to the mean temperature of the fluid through the section 15. The cams 83, 84 may be designed as uniform rise cams or to take care of any characteristics or relationship as may be desired. Through their interrelation an indicator 85 is continuously positioned relative to an index and recording chart 86 to advise the time-temperature relationship for the conversion section 15.

An indicator pen 90 is positioned with the indicator 85 by time-temperature relation but is further provided with a stock factor adjustment 91 so that the pen 90 records on the chart 86 the yield per pass. The stock factor adjustment 91 is available to correct for deviations in specific gravity, anilin number, and such other variables as may affect the charge or fluid entering the conduit 1.

The orifice 12 may be within the heater having a fluid flow path. In Fig. 2 the orifice 12 is shown away from the coils 14, 15 and heat source 2 only as a matter of clarity in the drawings.

Figure 3:
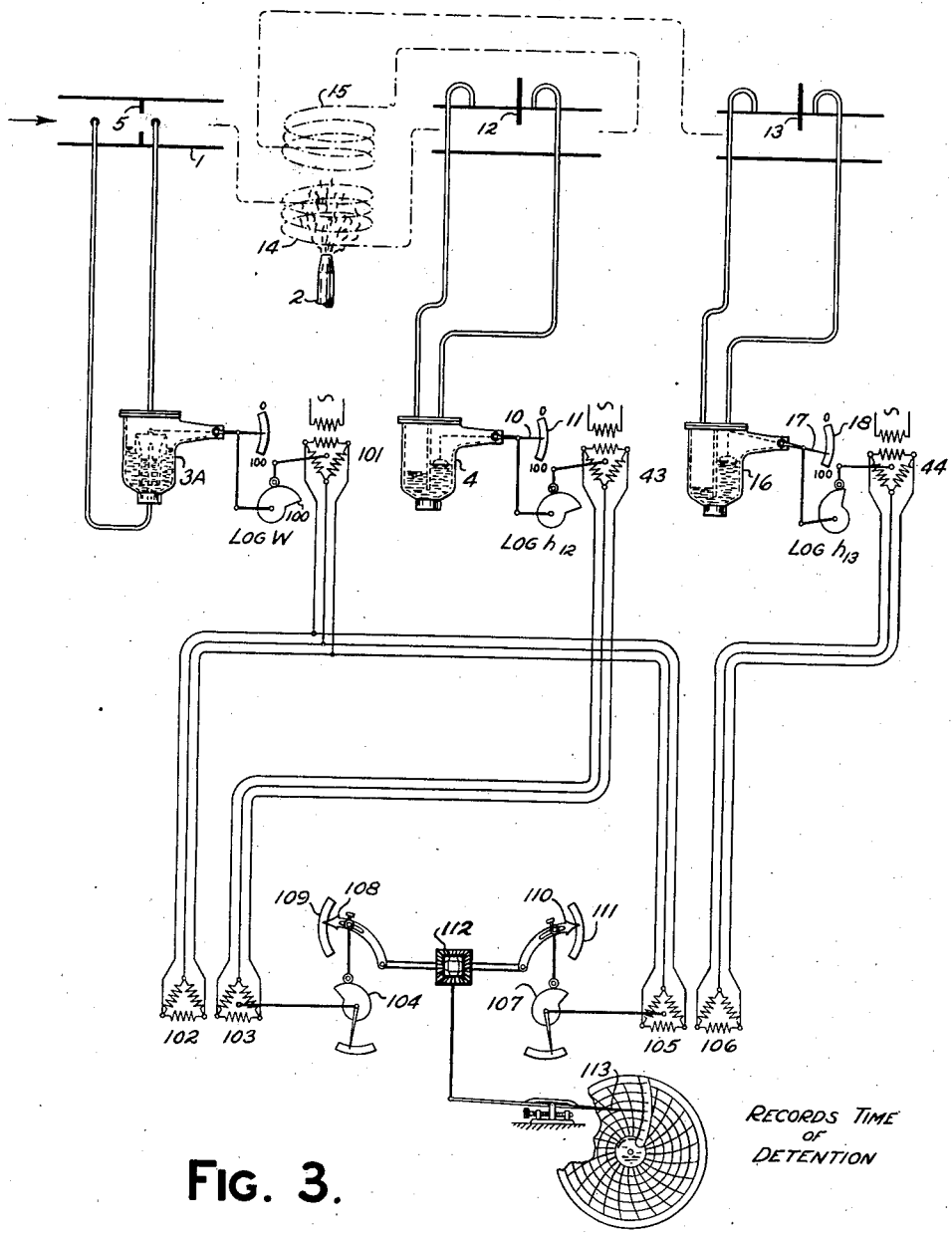
Fig. 3 is a diagrammatic illustration of a further embodiment of my invention.

In Fig. 3 I illustrate a further arrangement to indicate or record time of detention or treatment. A rate-of-flow meter 3A is of a type having a shaped liquid sealed bell adapted to correct for the quadratic relation between differential head and rate of flow and positions a cam 100 directly in accordance with W or pounds per unit of time. The transmitter 101 moves proportional to log W.

The differential receiver 102—103 is sensitive to log W and log $h_{12}$ positioning the antilog cam 104 according to $$\log W - \log h_{12} = \log \frac{W}{h_{12}}$$

Likewise the receiver 105—106 is sensitive to log W and log $h_{13}$ positioning the antilog cam 107 according to $$\log W - \log h_{13} = \log \frac{W}{h_{13}}$$

The pointer 108 then indicates relative to the index 109 the value of $$\frac{W}{h_{12}}$$

and pointer 110 relative to index 111 the value of $$\frac{W}{h_{13}}$$

The two are algebraically added through the mechanical differential 112 and the pen 113 indicates and records time of detention or treatment, from:

$$W = 360 cfD^2 \sqrt{h_5 d_5}$$

$$= K_5 \sqrt{h_5 d_5}$$

$$d_{12} = d_5 \frac{K_5^2}{K_{12}^2} \times \frac{h_5}{h_{12}}$$

$$W_{13} = W_5 = K_{13} \sqrt{h_{13} d_{13}}$$

$$d_{13} = d_5 \frac{K_5^2}{K_{13}^2} \times \frac{h_5}{h_{13}}$$

and $$md_{15} = \frac{d_{12}+d_{13}}{2} = \frac{d_5}{2}\left[\frac{K_5^2 h_5}{K_{12}^2 h_{12}} + \frac{K_5^2 h_5}{K_{13}^2 h_{13}}\right]$$

$$T = \frac{V m d_{15}}{W}$$

V = Volume (a constant)

$$W = K_5 \sqrt{h_5 d_5}$$

$$T = \frac{V}{2}\left[\frac{W}{K_{12}^2 h_{12}} + \frac{W}{K_{13}^2 h_{13}}\right]$$

While I have chosen to illustrate and describe the functioning of my invention in connection with the heating of petroleum or hydrocarbon oil, it is to be understood that the apparatus is equally applicable to the treatment, processing, or working of other fluids, such for example, as in the vaporization of water to form steam.

Figure 4:
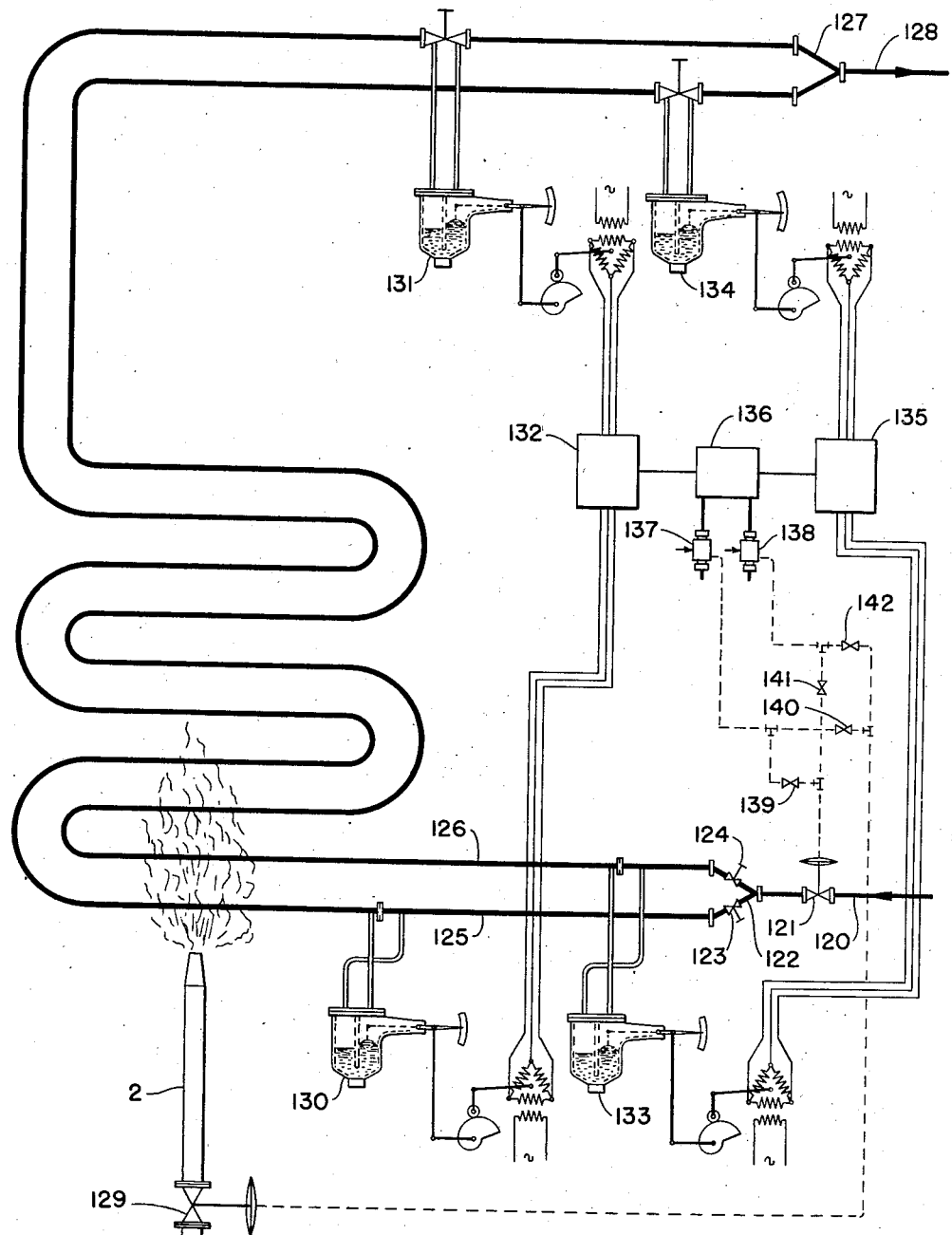
Fig. 4 is a diagrammatic illustration of a further embodiment of my invention.

Referring now in particular to Fig. 4, I illustrate thereon an arrangement of my invention in connection with a common type of petroleum or other heater. In this arrangement the fluid flow path constitutes a plurality of parallel long small-bore tubes, and I have illustrated in Fig. 4 that two tubes pass in parallel through the furnace. It is equally possible that there may be three or more tubes in parallel within the confines of the furnace.

The supply fluid or charging stock enters by way of the conduit 120, passing through a regulating valve 121 to a Y fitting 122 containing hand valves 123, 124 in its branches. From the Y fitting 122 the two parallel conduits 125, 126 pass through the furnace chamber either sinously or coiled or arranged as may be best desired for heat transfer purposes, as well as ease of support and other constructional details.

The conduits 125, 126 leave the heater and join together by a Y fitting 127, thence passing to an outgoing conduit 128.

A common source of heating (the burner 2) is shown for heating the parallel tubes 125, 126; although the arrangement of heating may be in any of various well known manners or types of apparatus. The supply of fuel for heating, or of the elements of combustion, is under the control of a regulating valve 129.

In the operation of such a fluid heater it is of primary importance that the product leaving the tubes 125, 126 shall be in substantially the same condition as to density or other quality, and furthermore that the condition or quality of the total fluid passing out of the conduit 128 shall be as desired. Thus it is necessary to control either the rate of charge by means of the regulating valve 121 or the heating by means of the regulating valve 129 from some indication or determination of the density or other conditions of the fluid leaving the conduits 125, 126 or 128.

To accomplish this purpose I preferably utilize the apparatus previously discussed in connection with the other figures of the drawings. I preferably ascertain the density in situ of the fluid leaving the conduit 125 separately and independently from a determination of the density of the fluid leaving the conduit 126. I then obtain either an average of the two densities or a ratio of the two densities and selectively from either the average or the ratio I control either the rate of fluid inflow to the circuit or the rate of heating, or both.

The density or specific gravity of the charge fluid entering the conduits 125, 126 is known and uniform. The meters 130, 131 located at the inlet and at the outlet of the conduit 125 are similar to the meters 3 and 4 previously described, and are each adapted to position a transmitting self-synchronous generator. The two transmitters are electrically connected to the device 132 wherein is performed the determination of density of the fluid leaving the conduit 125, as previously explained in connection with Fig. 2. In similar manner the meters 133, 134 are connected at the inlet and outlet respectively of the conduit 126 and coact upon the device 135 to determine density of the fluid leaving the conduit 126. The devices 132, 135 may be provided with indicators or with recording mechanisms for visually manifesting and/or recording the value of density of the fluid leaving the separate conduits 125, 126.

The density determining devices 132, 135 are shown in Fig. 4 diagrammatically as connected to a device 136 incorporating mechanism previously explained for either averaging the two densities or obtaining the ratio of the two. In connection with the device 136 I provide an air pilot valve 137 whose position is representative of the average densities of the fluids leaving the conduits 125, 126. This pilot valve establishes an air loading pressure continuously representative of the average of the densities, and this may be selectively applied, by means of the valves 139, 140 upon either the fuel control valve 129 or the rate of charge control valve 121.

In similar manner the device 136 positions an air pilot valve 138 establishing an air loading pressure representative of the ratio of the densities, and which is made effective selectively through the hand control valves 141, 142 upon either the fuel control valve 129 or the rate of charge control valve 121.

It will thus be seen that I may selectively control the treatment, i. e. the rate of charge and/or the rate of firing of the furnace, either from the average of the densities of the fluids leaving the conduits 125, 126 or selectively from the ratio of said densities. I may control either the supply of the elements of combustion or the rate of supply of fluid to the conduits from either the average or the ratio of the densities; or I may control one from one and one from the other.

It is to be appreciated and understood that by the processing or treatment of the fluid flowing through the conduits 125, 126 I intend to mean either a heating or other acting upon which will vary a condition of the fluid, such for example as density. The treatment may broadly be a variation or control of the heating as well as of the rate of flow of the fluid through the treatment zone.

I have not felt it necessary to duplicate in Fig. 4 the detailed arrangement of averaging and ratio means which has already been explained in connection with other figures of the drawings.

While I have illustrated and described certain preferred embodiments of my invention it will be understood that I am to be limited thereby only as to the claims. This application forms a continuation-in-part of my copending application Serial No. 152,855 filed July 9, 1937.

What I claim as new, and desire to secure by Letters Patent of the United States, is:

1. In a fluid heater through which a fluid is continually passed under pressure without change in weight rate of flow while being heated, apparatus adapted to continuously determine the in situ density of the fluid after it has been heated, characterized by, means in the flow path at the entrance to the heater and after the heating separately measuring the velocity of fluid flow, a transmitting generator associated with each of said means, means for positioning said generators in relation to logarithmic functions of said measurements, a receiving motor positioned in accordance with the difference in positions of the generators, and means positioned by the said receiving motor in antilogarithmic relation to the position of the motor.

2. Apparatus for determining the mean density of a flowing fluid throughout a section of its flow path, comprising in combination, means including a member positioned in accordance with the logarithm of a function of the velocity of the fluid at the inlet to said section, means including a second member positioned in accordance with the logarithm of a function of the velocity of the fluid at the outlet of said section, means including a third member positioned in accordance with the logarithm of a function of the velocity of the fluid at a reference point in the flow path ahead of said inlet, means under the control of said first and third members for obtaining the antilogarithm of the logarithm of the quotient of said functions of the reference and inlet flows, other means under the control of said second and third members for obtaining the antilogarithm of the logarithm of the quotient of said functions of the reference and outlet flows, and means positioned by said means and said other means for continuously averaging the two antilogarithms.

3. In a fluid heater having a fluid path, means for determining the mean density of the fluid between two points in the fluid path comprising in combination, means in said fluid path at the entrance to the heater and at each of the two points to measure the velocity of flow, a transmitting generator associated with each of said means, means for positioning said generators in relation to a logarithmic function of said measurements, a first receiving motor positioned in accordance with the difference in positions of the generators associated with the measuring means responsive to the velocity of flow at the entrance to said heater and at one of said points, means positioned by the first receiving motor in relation to an antilogarithmic function of the position of the first receiving motor, a second receiving motor positioned in accordance with the difference in positions of the generators associated with the measuring means responsive to the velocity of flow at the entrance to said heater and at the other of said points, means positioned by the second receiving motor in relation to an antilogarithmic function of the said second receiving motor, and an indicating element positioned jointly by said last two named means.

4. In a fluid heater having a fluid path, means for determining the density of the fluid at a point in the path within said heater, comprising in combination, means in said path at the entrance to the heater and at said point to measure the velocity of flow, a transmitting generator associated with each of said last named means, means for positioning said generators in relation to logarithmic functions of said measurements, a receiving motor positioned in accordance with the difference in positions of the generators associated with the measuring means responsive to the velocity of flow at the entrance to said heater and at said point, means positioned by the receiving motor in antilogarithmic relation to the position of the receiving motor, and an indicator positioned by said last named means.

5. In a fluid processing system wherein a fluid is continuously forced under pressure through a flow path while being subjected to a condition change which will affect the density of the fluid without changing its weight rate of flow the improvement which includes, means continuously determining the weight rate of fluid flow, means continuously determining another flow factor prior to condition change, a first means continuously logarithmically obtaining the ratio of such determinations, means continuously determining another flow factor after the condition change, a second means continuously logarithmically obtaining the ratio of the weight rate determination and the flow factor after condition change, and means continuously algebraically adding the ratios so obtained.

JOHN F. LUHRS.